May 3, 1949. E. A. STALKER Re. 23,108

AXIAL BLOWER

Original Filed June 11, 1943

INVENTOR

Edward A. Stalker

By Marechal and Biebel

ATTORNEYS

Reissued May 3, 1949 Re. 23,108

UNITED STATES PATENT OFFICE 23,108

AXIAL BLOWER

Edward A. Stalker, Bay City, Mich.

Original No. 2,405,768, dated August 13, 1946, Serial No. 490,419, June 11, 1943. Application for reissue February 17, 1949, Serial No. 77,041

12 Claims. (Cl. 230—122)

My invention relates to blowers and particularly to the form of the blades for use therein.

It is the principal object of the invention to provide a blower having blades of such construction and arrangement that in operation the pressure is well distributed over the surface of the blade substantially eliminating a sharp peak pressure condition at any point and making it possible to operate the blade at a high speed with highly effective and efficient results.

It is also an object to provide such a blower capable of satisfactory operation at a relative flow speed approaching the speed of sound.

It is a further object to provide a blade of this character having an airfoil section which favors the control of the boundary layer. Other objects will appear from the description and drawing.

I accomplish the above objects by the means illustrated in the accompanying drawing in which—

Figure 1:
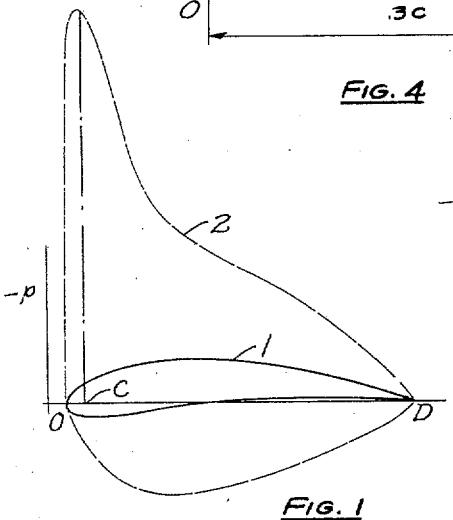
Fig. 1 is a diagrammatic view of the pressure distribution over a blade of conventional construction.

In an axial flow blower the blades operate with a rather wide range of angles of attack. The largest useful angle of attack occurs when the blower is pumping fluid against a large pressure. For this condition the conventional blade 1 has a pressure distribution curve 2 substantially as shown in Fig. 1, negative pressures being used as ordinates at the different stations along the blade as shown. It is to be observed that this curve has a peak more than 50% higher than the value corresponding to the average sub-pressure on the wing. A compressibility burble on the blade supervenes when the local velocity reaches the velocity of sound in the local fluid. Hence this peak velocity fixes the upper limit of the blade speed relative to the main flow. It is clear therefore that the blade may be operated at a higher speed provided this peak pressure condition is overcome and a maximum pressure obtained which is distributed over a substantial area of the blade and made as small as possible above the average pressure. The pressure is of course directly related to the square of the velocity according to Bernoulli's equation.

Figure 4:
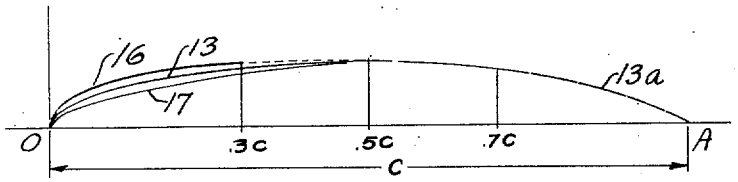
Fig. 4 is a diagrammatic view showing the manner of developing the preferred blade form.

The basic form of the blade which will provide the uniform velocity and properly distributed pressure across the major portion of the chord is shown in Fig. 4 which gives the upper half of the section. In the preferred form the forward half of the contour 13 is substantially elliptical. That is, the contour ahead of the ordinate at the maximum thickness of the section, which in this case is located at the point 0.5C, corresponds to a semi-ellipse.

The airfoil section of elliptic form, Fig. 4, and no arching of the mean camber line I call the basic airfoil section. The ordinate above the line OA represents one-half of the thickness of the airfoil section.

An airfoil section of any form may be readily converted to a section with an arched mean camber line, and vice versa. This may be done by laying off the abscissa from the origin 0 along the camber line and describing a circle so that each radial length equals the ordinate of the corresponding basic airfoil section. It is important in so doing that the abscissa be laid off along the mean camber line rather than along the subtending chord line.

Figure 2:
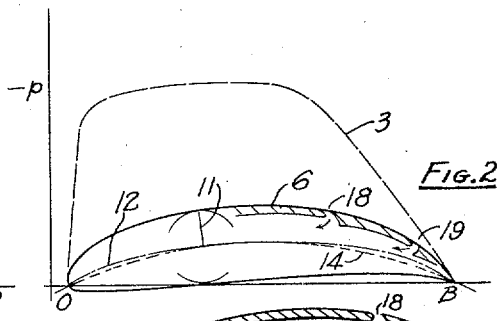
Fig. 2 is a section through a blade constructed in accordance with the present invention and incorporating such blades along the line 2—2 in Fig. 3.
Figure 2A:
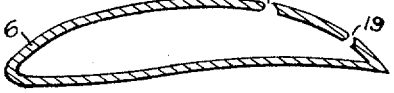
Fig. 2A is a sectional view through the completed airfoil section developed from Fig. 2 in accordance with the present invention.

The mean camber line preferably has the substantially arched form 12 shown in Fig. 2 (dot and dash lines). Its ordinates above the subtending chord are greater at the extremities of the wing than those of a circular arc 14 (shown by dotted lines) of the same maximum height passing through the ends of the chord line. The abscissae are laid off along the mean camber line and the ordinates 11 for upper and lower surfaces are then struck as arcs with their centers on such mean camber line. This defines the upper and lower airfoil surfaces. Following this procedure with the elliptic curve 13 and transferring the same to the arched mean camber line 12 of Fig. 2, the final upper and lower airfoil surfaces for blade 6 are obtained.

This blade 6 shaped as shown in Fig. 2 develops the same lift as that of Fig. 1, that is, the average ordinate of the sub-pressure curve 3 is equal to the average ordinate of the sub-pressure curve 2 in Fig. 1. It is to be noted that the curve 3 has a substantially constant value over a major part, approximately 60 per cent of the chord of the blade and that the high peak condition of Fig. 1 has been eliminated. It will be clear that the blade of Fig. 2 could operate at a higher speed relative to the main flow before the velocity of sound is reached locally on the blade surface, and that it is therefore capable of producing improved results because the pressure the blade can exert on the fluid will be higher as a result of the higher permissible rate of rotation than for the blade of Fig. 1.

The elliptic curve defining the basic airfoil section may vary within a predetermined range. Fig. 4 shows by the contours 16 and 17, the limits of variation in the nose contour which permit of keeping the velocity substantially constant along the section. If this velocity is not to vary substantially, the flow should divide at the forward end of the mean camber line. When the division occurs at a point nearer the lower contour the velocity over the nose is increased and while a small increase can be tolerated, it should be kept to a minimum. The contour 16 is an arc of an ellipse whose minor semi-axis is located at 0.3C instead of at 0.5C as is the case with curve 13. Contour 16 is faired into the aft portion of the contour 13—13*a*. This curve defines the upper limit to the ordinates of the nose contour. For the purposes of further discussion the curve portion 16 is considered to extend to the end of the maximum thickness ordinate. The upper aft portion 13*a* of the curve has the convex curvature as shown up to the end of the section where it terminates with a relatively sharp trailing edge as indicated at A in Fig. 4.

The contour 17 is a curve laid off below curve 13. At any station along the chord line the differences between the ordinates of curves 13 and 16 and between 13 and 17 are equal. The curve 17 then defines the lower limit to the ordinates of the nose contour.

It may thus be stated that the preferred contour for the nose portion of the blade section lies within a family of substantially elliptical curves whose mean curve is 13 the minor semi-axis of which is located at 0.5C, and whose outer or boundary curve (of the family) is the elliptic arc 16 extended to the maximum thickness ordinate at the mid-point of the chord. That is by defining one boundary curve and the mean curve, the other boundary curve is immediately defined. The actual blade section is then determined by transferring such curves from a straight line to a highly arched mean camber line as above described.

The location of the maximum thickness ordinate at the mid-point of the chord gives optimum results but it is possible to place the maximum thickness ordinate further forward with some impairment of the beneficial results. If it is placed as far forward as the 40 per cent point of the chord the benefits obtained by the special airfoil shape are only slight and therefore this location at 40 per cent of the chord is taken as the forward desired limit.

It is theoretically possible to place the maximum thickness ordinate far to the rear of the mid-point of the chord when slots are used to compel the fluid to follow blade contour. However when the maximum thickness ordinate is aft of the 60 per cent point of the chord the upper and lower contours of the blade section converge so rapidly that very large suction is required at the slots to compel the fluid to follow the upper contour. For discharge slots the pressure must be very high to effect a like result. The practical rearward location is near the 60 per cent point and accordingly this is taken as the rearmost desired limit.

For further discussion I define the portion of the circumference of an ellipse between the ends of the major and minor axes as an elliptic quadrant.

The effectiveness of the blade is further enhanced by the provision of slots 18 and 19 for controlling the boundary layer. The slots may be located well rearward because the sub-pressure curve 3 is favorable to the flow following the blade contour back to at least the halfway station along the chord line 0B. That is, the pressure gradient is favorable over the front half of the blade section as indicated by the increasing suction (sub-pressure ordinate) in going from 0 toward B. In Fig. 1 the conventional blade has an unfavorable pressure gradient from C to D and favorable only from 0 to C, the maximum suction acting on a particle flowing from C to D acting forward and tending to stop the particle and cause separation of the flow from the surface. On blade form 6, Fig. 2, the maximum suction ordinate is always ahead of the particle at least until the mid-point of the section is reached. This is an important feature of the invention. Also the blade form makes it possible to locate the slots well back on the chord where the external sub-pressure is low and will therefore offer smaller opposition to the induction of the fluid into the blade, providing additional improved characteristics.

The greater the maximum ordinate of the mean camber line of the airfoil section the more significant it becomes to maintain a substantially constant velocity across a large part of the airfoil section chord—or to bring the maximum suction ordinate well aft along the wing. Conventional airfoil sections do not employ, in practice, mean camber maximum ordinates greater than 5 per cent of the length of the chord subtending the mean camber line. However by employing the special airfoil shape as described herein, I have found that the airfoil sections for the blower blades operate best with a mean camber maximum ordinate greater than 5 per cent of the chord, and that with such special shape the peak efficiency is shifted into the regime of blower operation where the pressure is highest. This corresponds to the flow condition on the airfoil section when the velocity across the blade is substantially constant for the forward half of the section. The provision for the coincidence of the maximum efficiency with the high pressure regime of the blower is a feature of this invention.

As the maximum camber is increased beyond 10 per cent of the chord length it becomes important to add the boundary layer control slots but they give some benefit at all camber values. The mean camber line should have its maximum ordinate in the neighborhood of the mid-point of the chord in order to promote a substantially constant velocity over a large forward portion of the blade section; the preferred location is at the mid-point. A shift forward from this location is more disadvantageous than a shift rearward. When the ordinate has been shifted as far forward as the 40 per cent point the same beneficial results are not secured.

For blades in a rotor which are placed closer than a gap to chord ratio of unity it is somewhat desirable to flatten the forward portion of the mean camber line and shift the maximum ordinate of the mean camber line rearward. It should however be between 50 per cent and 60 per cent of the chord length. Preferably this flattening does not extend substantially beyond distorting the mean camber line 12 into the circular arc 14.

The leading edge should be well rounded and may be approximated by a circular segment. The radius should be larger than 8 per cent of the maximum thickness of the airfoil section and substantially less than the maximum thickness. A preferred value would be of the order of 24 per cent of the maximum thickness with a preferred range of 20 to 40 per cent. If the blades are placed close together so that the ratio of gap to chord is substantially less than unity the greater nose radii are beneficial.

Figure 3:
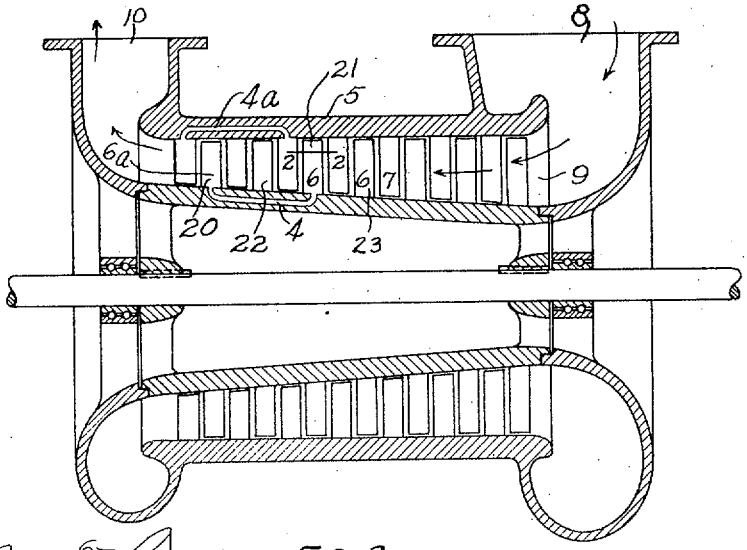
Fig. 3 is an axial section through a blower.

Fig. 3 is an axial section through a blower incorporating the present invention. Here the blower case is 5, the rotor blades are 6, 6*a*, etc., and the stator blades are 7, 7*a*, etc., both sets of blades preferably being constructed as above described. Fluid is inducted at 8 and compressed as it flows through the annular passage 9 to the exit 10.

Figure 5:
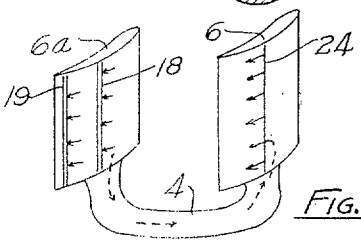
Fig. 5 is a schematic view showing the interconnection of the blades of two alternate stages of the blower.

In order to provide a flow of air through slots 18 and 19, a blower or other suitable means may be provided. However the arrangement as shown in copending application Serial No. 447,822 filed June 20, 1942 (with respect to which Patent No. 2,344,835 has issued as a continuation thereof) is preferably used. In accordance therewith and as shown in Figs. 3 and 5 the rotor blade 6 of an upstream rotor is connected by duct 4 to the interior of blade 6*a* of a downstream rotor. Each pair of alternate blades in the same axial plane is thus connected by separate ducts 4 which communicate between the interiors thereof, the remainder of the ducts not showing in Fig. 3 because they lie out of the plane of the section of the drawing.

The blades of the first and third rotor stage are in line with each other but are staggered peripherally relative to the blades of the second rotor stage to permit the passage of ducts 4 across the plane of the second rotor. The staggering of the blades of one rotor stage relative to those of the next permits alternate rotor stages to have their respective blades interconnected by the ducts.

The stator blades are arranged throughout in the same manner as the rotor blades to accommodate the ducts 4*a*.

The boundary layer of the blades enters the slots 18 and 19 of the downstream blades where the pressure is high and flows to the discharge slots 24 in the upstream blades where the pressure is low. Slot 24 is similar to slots 18 and 19 except that preferably the walls of the slot overlap to direct the outflowing jet rearwardly along the trailing blade surface. Both sets of slots serve to make the external flow follow the blade surfaces to very large angles of attack. The provision of such boundary layer control serves to energize the boundary layer on the trailing portion of the blade, in that range where the layer would tend to lose energy by reason of the adverse pressure gradient encountered, thereby improving the aerodynamic characteristics, and giving improved lift and drag characteristics. The provision of boundary layer control on a blade having the airfoil contour in accordance with the present invention is particularly advantageous as overcoming what would otherwise be a seriously limiting condition in operating a blade under the desired high speed conditions.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an axial flow blower, an enclosing casing, a blade having a basic airfoil section whose maximum thickness lies between stations at 40 per cent and 60 per cent of the chord length from the leading edge and whose upper contour ahead of the maximum thickness ordinate lies in major part within boundary curves whose mean curve is an elliptic quadrant passing through the nose point of the section and the end point of the said maximum thickness ordinate, said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, and means to mount said blade within said casing to induce a flow therethrough.

2. The structure of claim 1 wherein said blade has a slot in its surfaces, and means to induce a flow of fluid therethrough to control the boundary layer on said airfoil surface.

3. In an axial flow blower, an enclosing casing, an axial flow blade in said casing, said blade having a basic airfoil section over the portion thereof ahead of the maximum thickness ordinate, said basic section being defined by a curve lying within a family of substantially elliptical curves the mean curve of which has its minor semi-axis located between stations at the 0.4 and the 0.6 points of the chord and whose outer boundary curve has its minor semi-axis located approximately at the 0.3 point of the chord, the upper aft portion of said airfoil section having a convex curvature and ending in a relatively sharp trailing edge.

4. In an axial flow blower, an enclosing casing, an axial flow blade in said casing, said blade having a basic airfoil section over the portion thereof ahead of the maximum thickness ordinate, said basic section being defined by a curve lying within a family of substantially elliptical curves the mean curve of which has its minor semi-axis located between stations at the 0.4 and the 0.6 points of the chord and whose outer boundary curve has its minor semi-axis located approximately at the 0.3 point of the chord, the inner boundary curve of said family being a curve laid off below said mean curve in such relation thereto that said mean curve lies vertically midway between said boundary curves, the upper aft portion of said airfoil section having a convex curvature and ending in a relatively sharp trailing edge.

5. In an axial flow blower, an enclosing casing, an axial flow blade in said casing, said blade having a basic airfoil section over the nose portion thereof the maximum thickness ordinate of which is located between approximately the 40% and the 60% points of the chord, said basic section being defined by a curve lying within a family of substantially elliptical curves the mean curve of which has its minor semi-axis located at approximately the point of maximum thickness of the section and whose outer boundary curve has its minor semi-axis located approximately at the 0.3 point of the chord, the upper aft portion of said airfoil section having a convex curvature and ending in a relatively sharp trailing edge.

6. In an axial flow blower, an enclosing casing, an axial flow blade in said casing, said blade having a basic airfoil section over the portion thereof ahead of the maximum thickness ordinate based on a mean camber line which is a straight line, said basic section being defined by a curve lying within a family of substantially elliptical curves the mean curve of which has its minor semi-axis located between stations at the 0.4 and the 0.6 points of the chord and whose outer boundary curve has its minor semi-axis located at the 0.3 point of the chord, the surface of said blade determined by said basic airfoil section being developed with respect to an arched mean camber line the maximum ordinate of which above the subtending chord is greater than approximately 5% of the length of the chord.

7. In an axial flow blower, an enclosing casing, an axial flow blade in said casing, said blade having a basic airfoil section over the portion thereof ahead of the maximum thickness ordinate based on a mean camber line which is a straight line, said basic section being defined by a curve lying within a family of substantially elliptical curves the mean curve of which has its minor semi-axis located between stations at the 0.4 and the 0.6 points of the chord and whose outer boundary curve has its minor semi-axis located at the 0.3 point of the chord, the surface of said blade determined by said basic airfoil section being developed with respect to a mean camber line which is arched above a circular arc of the same maximum height passing through the ends of the chord line.

8. In an axial flow blower, an enclosing casing, an axial flow blade in said casing, said blade having a basic air foil section over the portion thereof ahead of the maximum thickness ordinate based on a mean camber line which is a straight line, said basic section being defined by a curve lying within a family of substantially elliptical curves the mean curve of which has its minor semi-axis located between stations at the 0.4 and the 0.6 points of the chord and whose outer boundary curve has its minor semi-axis located at the 0.3 point of the chord, the surface of said blade determined by said basic airfoil section being developed with respect to an arched means camber line, said mean camber line having a height above the subtending chord greater than about 5% of said chord, the upper aft portion of said airfoil section having a convex curvature and ending in a relatively sharp trailing edge.

9. In an axial flow blower, an enclosing casing, an axial flow blade in said casing, said blade having a basic airfoil section over the portion thereof ahead of the maximum thickness ordinate, said basic section being defined by a curve lying within a family of substantially elliptical curves the mean curve of which has its minor semi-axis located between stations at the 0.4 and the 0.6 points of the chord and whose outer boundary curve has its minor semi-axis located approximately at the 0.3 point of the chord, said blade having a slot in its surface, and means to induce a flow of fluid therethrough to control the boundary layer on the surface thereof.

10. In an axial flow blower, an enclosing casing, an axial flow blade in said casing, said blade having a basic airfoil section over the portion thereof ahead of the maximum thickness ordinate based on a mean camber line which is a straight line, said basic section being defined by a curve lying within a family of substantially elliptical curves the mean curve of which has its minor semi-axis located between stations at the 0.4 and the 0.6 points of the chord and whose outer boundary curve has its minor semi-axis located at the 0.3 point of the chord, the surface of said blade determined by said basic airfoil section being developed with respect to an arched mean camber line, said mean camber line having a height above the subtending chord greater than about 5% of said chord length, the upper aft portion of said airfoil section having a convex curvature and ending in a relatively sharp trailing edge and the lower aft portion of said section having a substantial concavity therein.

11. In an axial flow blower, an enclosing casing, an axial flow blade in said casing, said blade having a basic airfoil section over the portion thereof ahead of the maximum thickness ordinate based on a mean camber line which is a straight line, said basic section being defined by a curve lying within a family of substantially elliptical curves, the mean curve of which has its minor semi-axis located within the range of about the 0.4 and the 0.6 points of the chord and the outer boundary curve of which has its minor semi-axis located at the 0.3 point of the chord, the surface of said blade determined by said basic airfoil section being developed with respect to a mean camber line which is arched at its aft end above a circular arc of the same maximum height passing through the ends of the chord line.

12. In an axial flow blower, an enclosing casing, an axial flow blade in said casing, said blade having a basic airfoil section over the portion thereof ahead of the maximum thickness ordinate, said basic section being defined by a curve lying within a family of substantially elliptical curves and below the mean curve thereof, said mean curve of said family having its minor semi-axis located within a range of about the 0.4 and the 0.6 points of the chord, the outer boundary curve of said family having its minor semi-axis located approximately at the 0.3 point of the chord, said blade having a slot in its surface, and means to induce a flow of fluid therethrough to control the boundary layer on the surface thereof.

EDWARD A. STALKER.

No references cited.

Certificate of Correction

Reissue No. 23,108. May 3, 1949.

EDWARD A. STALKER

It is hereby certified that error appears in the printed specification of the above numbered patent requiring correction as follows:

Column 7, line 52, claim 8, for the word "means" read *mean*;

and that the said Letters Patent should be read with this correction therein that the same may conform to the record of the case in the Patent Office.

Signed and sealed this 18th day of October, A. D. 1949.

[SEAL]

THOMAS F. MURPHY,
*Assistant Commissioner of Patents.*